(12) United States Patent
Yun et al.

(10) Patent No.: US 10,710,477 B2
(45) Date of Patent: Jul. 14, 2020

(54) DEVICE FOR TILTING AND SWIVELING SEAT OF VEHICLE

(71) Applicants: Hyundai Motor Company, Seoul (KR); Kia Motors Corporation, Seoul (KR)

(72) Inventors: Seong Mun Yun, Gyeonggi-do (KR); Hyun Kyu Moon, Gyeonggi-do (KR); Ju Yeol Kong, Gyeonggi-do (KR); Seon Chae Na, Gyeonggi-do (KR); Hyung Jin Park, Seoul (KR); Seung Hyun Kim, Daejeon (KR); So Young Yoo, Gyeonggi-do (KR); Sung Hak Hong, Gyeonggi-do (KR); Chan Ho Jung, Gyeonggi-do (KR); Mu Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 34 days.

(21) Appl. No.: 16/210,167

(22) Filed: Dec. 5, 2018

(65) Prior Publication Data

US 2020/0062148 A1     Feb. 27, 2020

(30) Foreign Application Priority Data

Aug. 21, 2018 (KR) ........................ 10-2018-0097152

(51) Int. Cl.
| | |
|---|---|
| *B60N 2/14* | (2006.01) |
| *B60N 2/16* | (2006.01) |
| *B60N 2/02* | (2006.01) |
| *B60N 2/68* | (2006.01) |

(52) U.S. Cl.
CPC ............. *B60N 2/14* (2013.01); *B60N 2/0232* (2013.01); *B60N 2/165* (2013.01); *B60N 2/1695* (2013.01); *B60N 2/68* (2013.01); *B60N 2002/022* (2013.01); *B60N 2002/0236* (2013.01)

(58) Field of Classification Search
CPC .... A47C 3/18; A47C 4/01; A47C 3/30; A47C 9/002; B60N 2/14; B60N 2/146; B60N 2/06; B60N 2/062
See application file for complete search history.

(56) References Cited

U.S. PATENT DOCUMENTS

| | | | | |
|---|---|---|---|---|
| 4,792,188 A * | 12/1988 | Kawashima | ........... | B60N 2/146 248/418 |
| 6,027,170 A * | 2/2000 | Benz | ........................ | B60N 2/14 248/425 |
| 7,726,730 B2 * | 6/2010 | Peter | ...................... | B60N 2/071 296/65.13 |
| 8,182,016 B2 * | 5/2012 | Kaip | .................. | B60N 2/01583 296/65.06 |
| 2003/0160488 A1 * | 8/2003 | Kim | ...................... | B60N 2/146 297/344.22 |

(Continued)

*Primary Examiner* — Shin H Kim
(74) *Attorney, Agent, or Firm* — Mintz Levin Cohn Ferris Glovsky and Popeo, P.C.; Peter F. Corless

(57) ABSTRACT

A device for tilting and swiveling a seat of a vehicle is provided. The device performs a tilting operation for relaxation by cooperation of a seat back and a seat cushion as well as a swiveling operation for rotating the seat in an indoor direction for conversion between passengers or rotating the seat in an outdoor direction for getting on and off vehicle assistance.

10 Claims, 11 Drawing Sheets

(56) References Cited

U.S. PATENT DOCUMENTS

| | | | |
|---|---|---|---|
| 2008/0012403 A1* | 1/2008 | Foelster | B60N 2/2893 297/217.1 |
| 2008/0224522 A1* | 9/2008 | Taguchi | B60N 2/06 297/344.21 |
| 2009/0256405 A1* | 10/2009 | Peter | B60N 2/071 297/216.19 |
| 2011/0109114 A1* | 5/2011 | Kolpasky | B60N 2/01 296/65.13 |
| 2014/0167469 A1* | 6/2014 | Haller | B60N 2/06 297/344.12 |
| 2015/0137572 A1* | 5/2015 | Auger | B60N 2/062 297/344.21 |

* cited by examiner

DEVICE FOR TILTING AND SWIVELING SEAT OF VEHICLE

CROSS-REFERENCE TO RELATED APPLICATION

This application claims under 35 U.S.C. § 119(a) the benefit of priority to Korean Patent Application No. 10-2018-0097152 filed on Aug. 21, 2018, the entire contents of which are incorporated herein by reference.

BACKGROUND

(a) Technical Field

The present disclosure relates to a device for tilting and swiveling a seat of a vehicle, and more particularly, to a device that performs a tilting operation for relaxation or a swiveling operation for face-to-face conversion between passengers and for getting on and off vehicle assistance.

(b) Background Art

With the increased development of autonomous vehicles capable of driving without driver's control, the seat to which various mechanisms for multi-party meetings and conversations, relaxation, sleeping, getting on and off vehicle assistance or the like are applied has been researched. However, since the seat is already provided with a basic mechanism for adjusting the position of the seat back and forth, adjusting the height of the seat up and down, tilting function, and the like, independently, and in addition to this, a swivel mechanism for the conversation mode between passengers and the getting on and off vehicle assistance is required to be applied, an increase in the number of constituent parts of the entire seat, complexity of the assembling structure, insufficient mounting space, and the like occur. Therefore, there has been a demand for an optimal design capable of realizing each function (e.g., tilting and swiveling) of the seat applied to an autonomous vehicle or the like by a single mechanism.

The above information disclosed in this section is merely for enhancement of understanding of the background of the disclosure and therefore it may contain information that does not form the prior art that is already known in this country to a person of ordinary skill in the art.

SUMMARY

Accordingly, the present disclosure provides a device for tilting and swiveling a seat of a vehicle capable of achieving a tilting operation for relaxation by cooperation of a seat back and a seat cushion as well as a swiveling operation for rotating the seat in an indoor direction for conversion between passengers or rotating the seat in an outdoor direction for getting on and off vehicle assistance.

A device for tilting and swiveling a seat of a vehicle according to the present disclosure to achieve the above objects, may include a seat cushion frame and a seat back frame integrally connected with each other; a fixing plate mounted on a fixed rail mounted at a floor panel; a rotating plate stacked and mounted on the fixing plate to be rotatable; a first side bracket mounted at both sides at a front end portion of the rotating plate; a second side bracket having a guide aperture formed to be inclined downwardly toward the front to allow a guide pipe formed at both sides of a lower end of the seat back frame to be inserted into the guide aperture to be moved, and mounted at both sides at a rear end portion of the rotating plate; and a tilting drive device installed between the seat cushion frame and the first side bracket, and raising or lowering a front end portion of the seat cushion frame.

A movable rail may be mounted to be movable on the fixed rail at both sides of a lower surface of the fixing plate. Particularly, a center rotating pin may be formed at a central position of the fixing plate to couple with a hinge to the rotating plate; and guide pins may be formed at four sides of the rotating plate. In addition, a hinge aperture to which the center rotating pin is fastened with a hinge may be formed at a central position of the rotating plate; and arc-shaped guide apertures into which the guide pins of the fixing plate are inserted may be formed at four sides of the rotating plate.

The arc-shaped guide apertures may be formed with an arc length that limits the rotation angle of the rotating plate to about 90°. In addition, a first motor may be mounted at a lower portion of the fixing plate; one of the guide pins may be adopted as a pinion connected to the output shaft of the first motor; and a sector gear engaged with the pinion may be formed in one of the arc-shaped guide apertures.

Further, the tilting drive device may include a fan-shaped gear fastened with a hinge to a front end portion of the first side bracket; a second motor mounted at an inner position of a rear end portion of the first side bracket; a drive gear connected with the output shaft of the second motor, mounted at a rear end portion of the first side bracket and engaged with the fan-shaped gear; and a support pipe attached at a front and lower portion and fastened with a hinge to the fan-shaped gear at both sides thereof.

In addition, the support pipe may be inserted into and penetrate a clamp to be rotatable and movable back and forth and the clamp may be mounted at a front lower portion of the seat cushion frame. The first side bracket may include a rotation support plate fastened with a hinge to the fan-shaped gear; and a rigidity reinforcing plate having a lower height than the rotation support plate and being vertically bent inward. A mounting end for mounting the second motor may be formed to further extend at a rear end portion of the rigidity reinforcing plate of the first side bracket.

Through the above-mentioned problem solving means, the present disclosure provides the following effects.

First, it may be possible to realize relaxation operation mode for rest and sleep or the like by allowing the seat back and seat cushion to be simultaneously tilted rearward to a certain angle.

Second, it may be possible to realize the facing and conversation between passengers mode by rotating the seat in an indoor direction and assist comfortably the getting on and off vehicle of passengers by optionally rotating the seat in an outdoor direction (e.g., in a door direction) for the getting on and off vehicle of passengers.

Third, the getting on and off vehicle motion of passengers may be more conveniently achieved by tilting the seat forward after rotating the seat in the outdoor direction (e.g., in the door direction).

BRIEF DESCRIPTION OF THE DRAWINGS

The above and other features of the present disclosure will now be described in detail with reference to exemplary embodiments thereof illustrated in the accompanying drawings which are given herein below by way of illustration only, and thus are not limitative of the present disclosure, and wherein.

Figure 1:
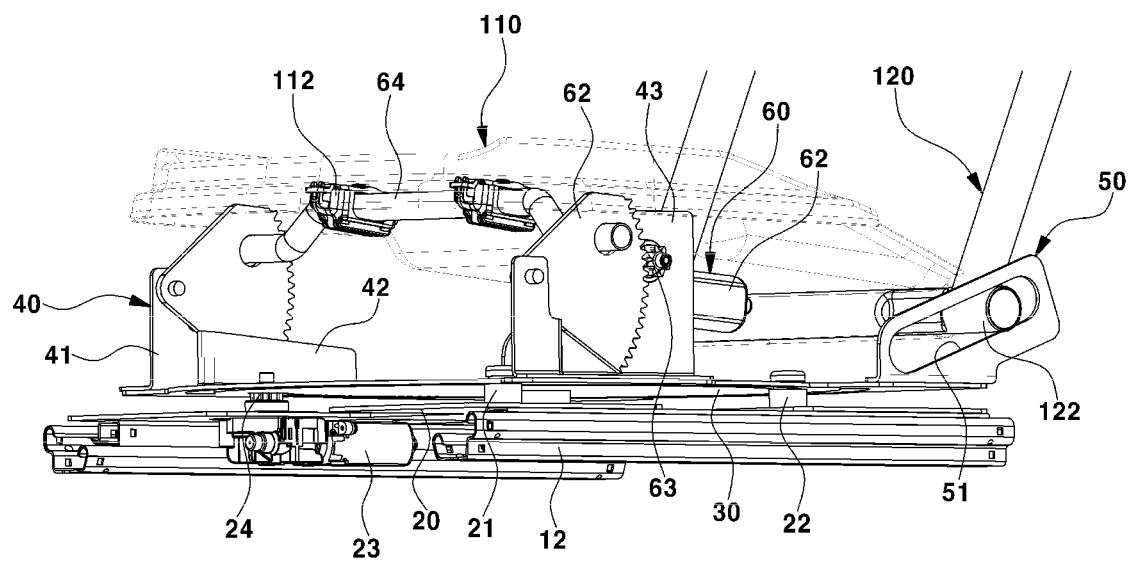
FIG. 1 is a perspective view showing a device for tilting and swiveling a seat of a vehicle according an exemplary embodiment of to the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The present disclosure is characterized in that a tilting mechanism in which a seat back and a seat cushion are tilted up or tilted down at the same time, and a swiveling mechanism in which the entire seat including a seat back and a seat cushion are rotated by about 90 degrees or more in one direction, are combined. Firstly, the swiveling mechanism for rotating the seat will be described as follows.

Figure 6:
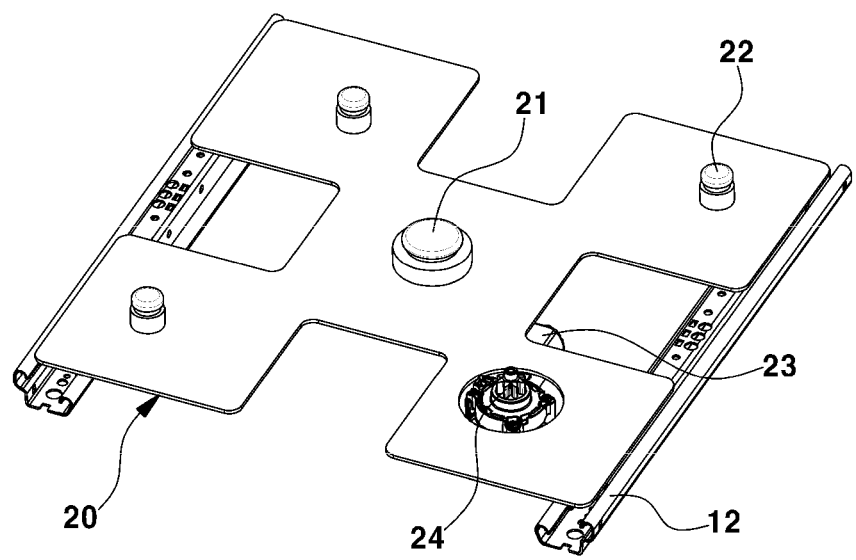
FIG. 6 and FIG. 7 are perspective views showing the configuration for the swiveling operation of the seat of the vehicle according to an exemplary embodiment of the present disclosure.
Figure 7:
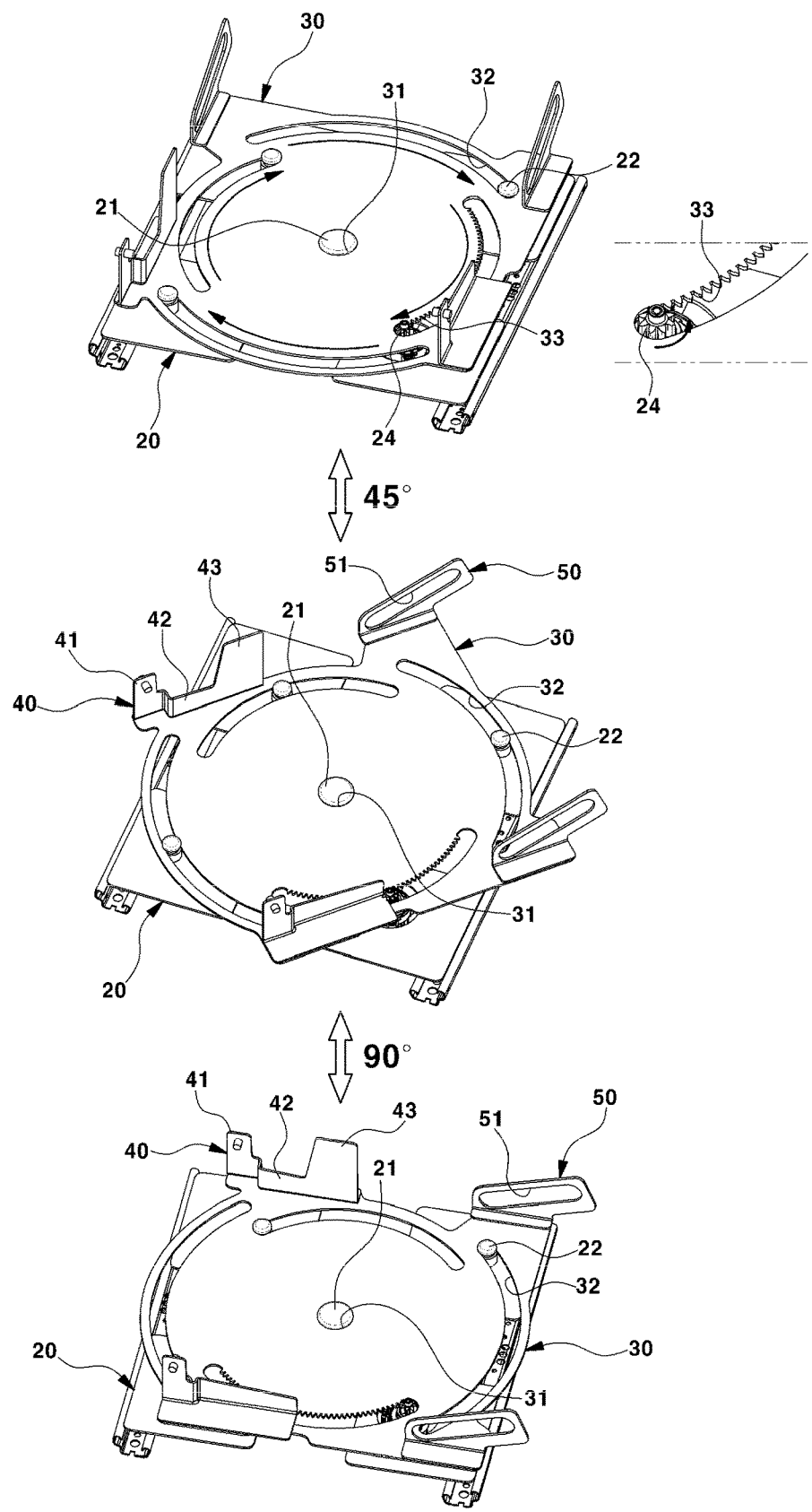

The attached FIG. 6 and FIG. 7 show a configuration for swiveling operation of the seat of the vehicle according to the present disclosure. In each drawing, reference numeral 12 indicates a movable rail which is slidably moved on a fixed rail mounted on an indoor floor panel of the vehicle. A fixing plate 20 is a support for the seat swivel and may be mounted on the movable rail 12. The movable rail 12 movably fastened to a fixed rail 10 (referring to FIG. 10) may be mounted on both sides of the bottom surface of the fixing plate 20.

Thus, the fixing plate 20 may be moved back and forth along the fixed rail 10 by the movable rail 12. The coupling structure between the fixed rail 10 and the movable rail 12 is well known and will not be described here. A center rotating pin 21 for hinge connection with a rotating plate 30 may be formed at the central position of the fixing plate 20, and a guide pin 22 may protrude at the corner of four sides.

Particularly, the rotating plate 30 may be stacked to be rotatable on the fixing plate 20 and rotated by about 90 degrees or more in one direction by the driving of a rotation driving device. Accordingly, a hinge aperture 31 to which the center rotating pin 21 is fastened with a hinge may be formed at a central position of the rotating plate 30, and an arc-shaped guide aperture 32 into which the guide pin 22 is inserted may be formed at four sides of the rotating plate 30. The arc-shaped guide aperture 32 may be formed with an arc length that limits the rotation angle of the rotating plate 30 in one direction to about 90 degrees.

Further, a locking structure such as a riveting may be applied to the center rotating pin 21 to prevent the center rotating pin 21 from being separated from the hinge aperture 31, and a locking structure such as riveting may be applied to the guide pin 22 to prevent the guide pin 22 from being separated from the arc-shaped guide aperture 32. A combination of a motor and a gear structure may be applied to the rotation driving device for rotating the rotating plate 30.

Accordingly, a first motor 23 may be mounted on the bottom portion of the fixing plate 20, one of the guide pins may be employed as a pinion 24 connected to the output shaft of the first motor 23, and an inner circumference surface of one of the arc-shaped guide apertures formed in the rotating plate 30 may be formed with a sector gear 33 which engages with the pinion 24. Therefore, when the rotational driving torque of the first motor 23 is transmitted to the sector gear 33 through the pinion 24, the rotating plate 30 may be rotated at an angle of about 90° in one direction.

More specifically, since the arc-shaped guide aperture 32 has an arc length that limits the rotation angle of the rotating plate 30 in one direction to about 90°, when the rotating plate 30 rotates to about 90°, the guide pin 22 may be contacted from a first end of the arc-shaped guide aperture 32 to a second end and thus, the one direction rotation angle of the rotating plate 30 may be limited to about 90°. When the arc length of the arc-shaped guide aperture 32 is formed to be longer, the rotation angle of the rotating plate 30 may be rotated at an angle greater than about 90 degrees.

Figure 2:
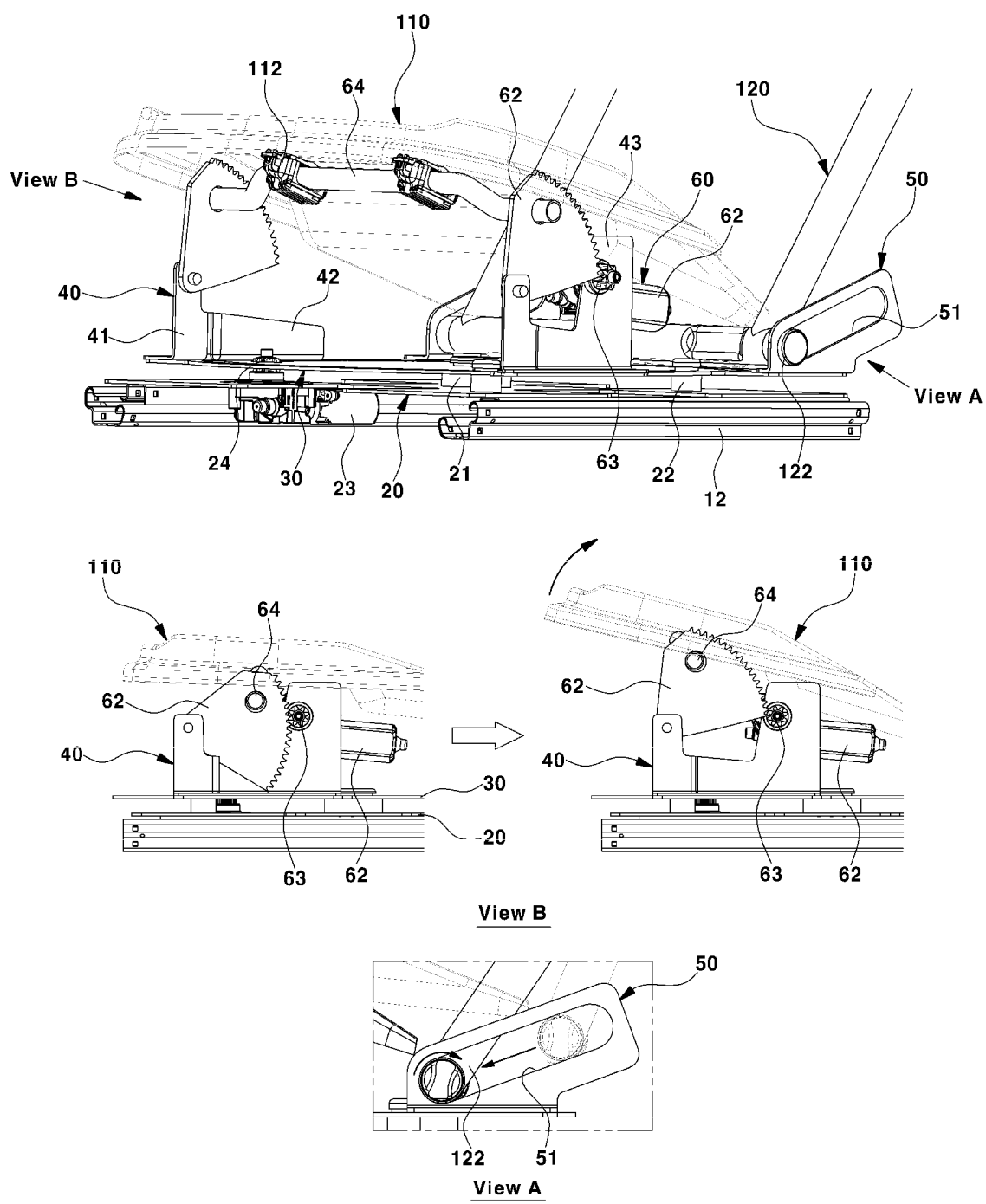
FIG. 2 is a perspective view showing a tilting-up operation state of the seat of the vehicle according to an exemplary embodiment of the present disclosure.
Figure 3:
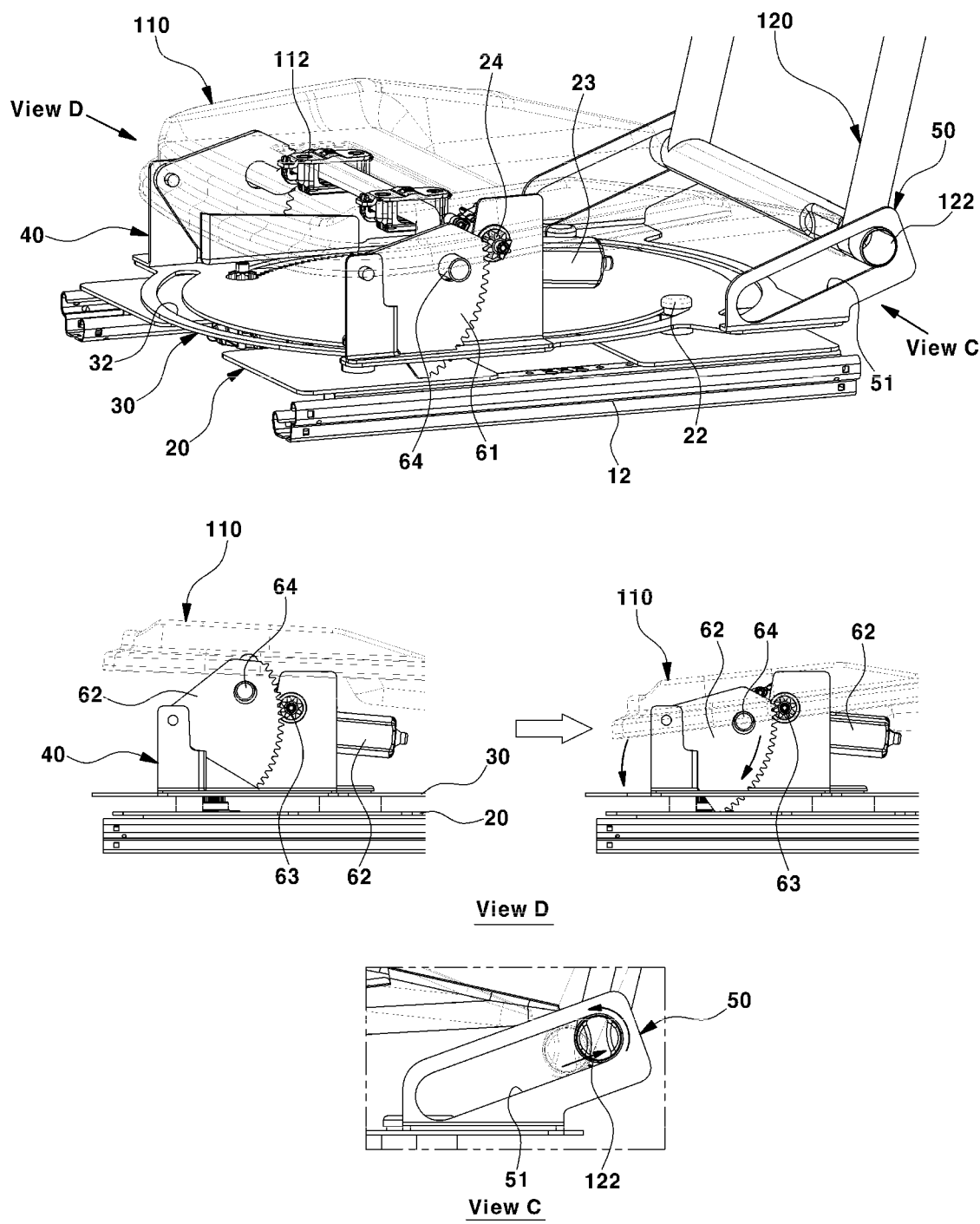
FIG. 3 is a perspective view showing a tilting-down operation state of the seat of the vehicle according to an exemplary embodiment of the present disclosure.

Herein, the configuration capable of tilting up or tilting down the seat back and the seat cushion at the same time is as follows. The attached FIG. 1 to FIG. 3 show a device for tilting and swiveling the seat of the vehicle according to the present disclosure, and reference numeral 110 denotes a seat cushion frame and reference numeral 120 denotes a seat back frame.

In particular, the seat cushion frame 110 and the seat back frame 120 may be integrally connected with each other to be tilted together. In other words, the rear end portion of the seat cushion frame 110 and the lower end portion of the seat back frame 120 may be integrally connected to each other by welding or the like. A clamp 112 may be mounted on the front lower portion of the seat cushion frame 110 to secure a tilting trace of the seat cushion frame 110 and the seat back frame 120, and a guide pipe 122 may be formed on both sides of the lower end of the seat back frame 120 in a protruded manner.

Additionally, first side brackets 40 and second side brackets 50 to which the seat cushion frame 110 and the seat back frame 120 are coupled for tilting and swiveling operation may be integrally formed or mounted on the rotating plate 30. The first side brackets 40 may be vertically erected at both sides and at front end portion of the rotating plate 30 and integrally formed with or mounted on the rotating plate 30. The first side brackets 40 may include a rotation support plate 41 to which a fan-shaped gear 61 of a tilting drive device 60 to be described later may be fastened with a hinge, and a rigidity reinforcing plate 42 having a height lower than that of the rotation support plate 41 based on an attachment supporting force of the fan-shaped gear 61 or the like and being inwardly vertically bent.

The second side brackets 50 may be vertically erected at both sides and at the rear end portion of the rotating plate 30 and integrally formed with or mounted on the rotating plate 30, and provided as a structure in which a guide aperture 51 inclined downwardly toward the front may be formed to be penetrated. Accordingly, a guide pipe 122 formed at both sides of the lower end of the seat back frame 120 may be inserted into and moved along the guide aperture 51.

To secure a mounting seat surface of a second motor 62 and a drive gear 63 of the tilting drive device 60 to be described later, a mounting end 43 for mounting the second motor 62 and the drive gear 63 may be integrally formed to be further extended at the rear end portion of the first side bracket 40. The tilting drive device 60 for raising or lowering the front end portion of the seat cushion frame 110 may be installed between the seat cushion frame 110 and the first side bracket 40.

More specifically, the tilting drive device 60 may include the fan-shaped gear 61 fastened with a hinge to the front end portion of the first side bracket 40, the second motor 62 positioned inside the mounting end 43 of the first side bracket 40, the drive gear 63 connected with the output shaft of the second motor 62 and attached to be rotatable on the mounting end 43 of the first side bracket 40, and a support pipe 64 inserted into a clamp 112 of the seat cushion frame 110.

Figure 4:
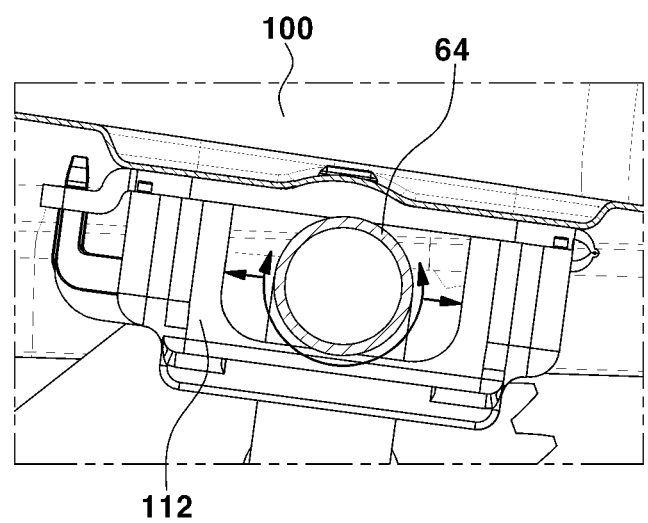
FIG. 4 is a cross sectional view of a main part showing a clamp structure for securing a tilting trace of a seat cushion frame when the seat of the vehicle according to an exemplary embodiment of the present disclosure is tilted.

The drive gear 63 may be engaged with the fan-shaped gear 61 to transmit power, and the both end portions of the support pipe 64 may be fastened with a hinge to the upper end portion of the fan-shaped gear 61. The clamp 112 may be mounted at the front lower end portion of the seat cushion frame 120, and, as shown in FIG. 4, to secure a tilting trace (e.g., angular rotation and front and rear moving trajectory) of the seat cushion frame 120, the clamp 112 may include a space in which the support pipe 64 may be rotated and moved back and forth. Herein, the seat tilting and swiveling operation of the present disclosure having the above-described configuration will be described below.

Tilting Operation

Figure 5A:
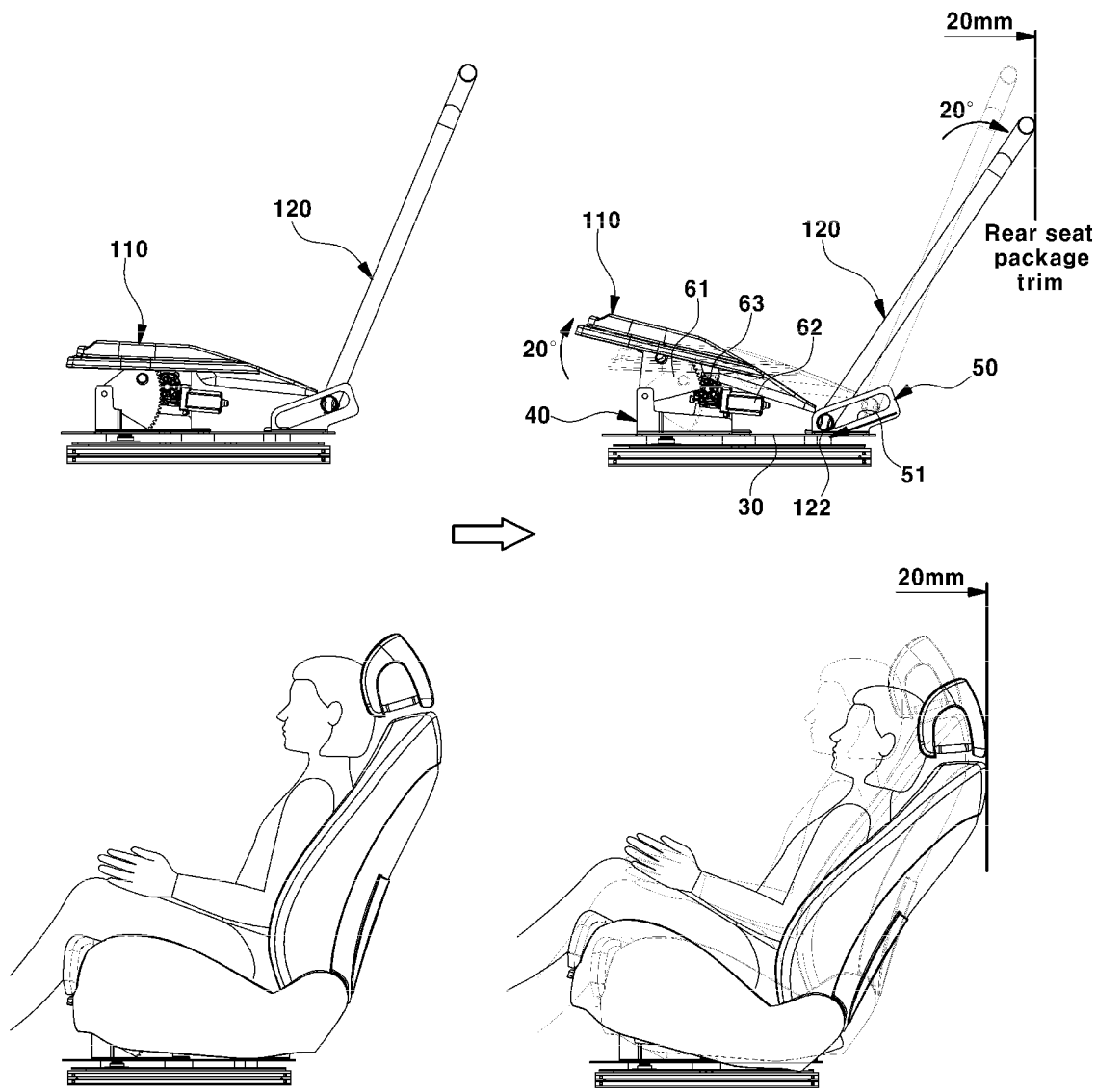
FIG. 5A is a side view showing a tilting-up operation state for relaxation of the seat of the vehicle according to an exemplary embodiment of the present disclosure.
Figure 5B:
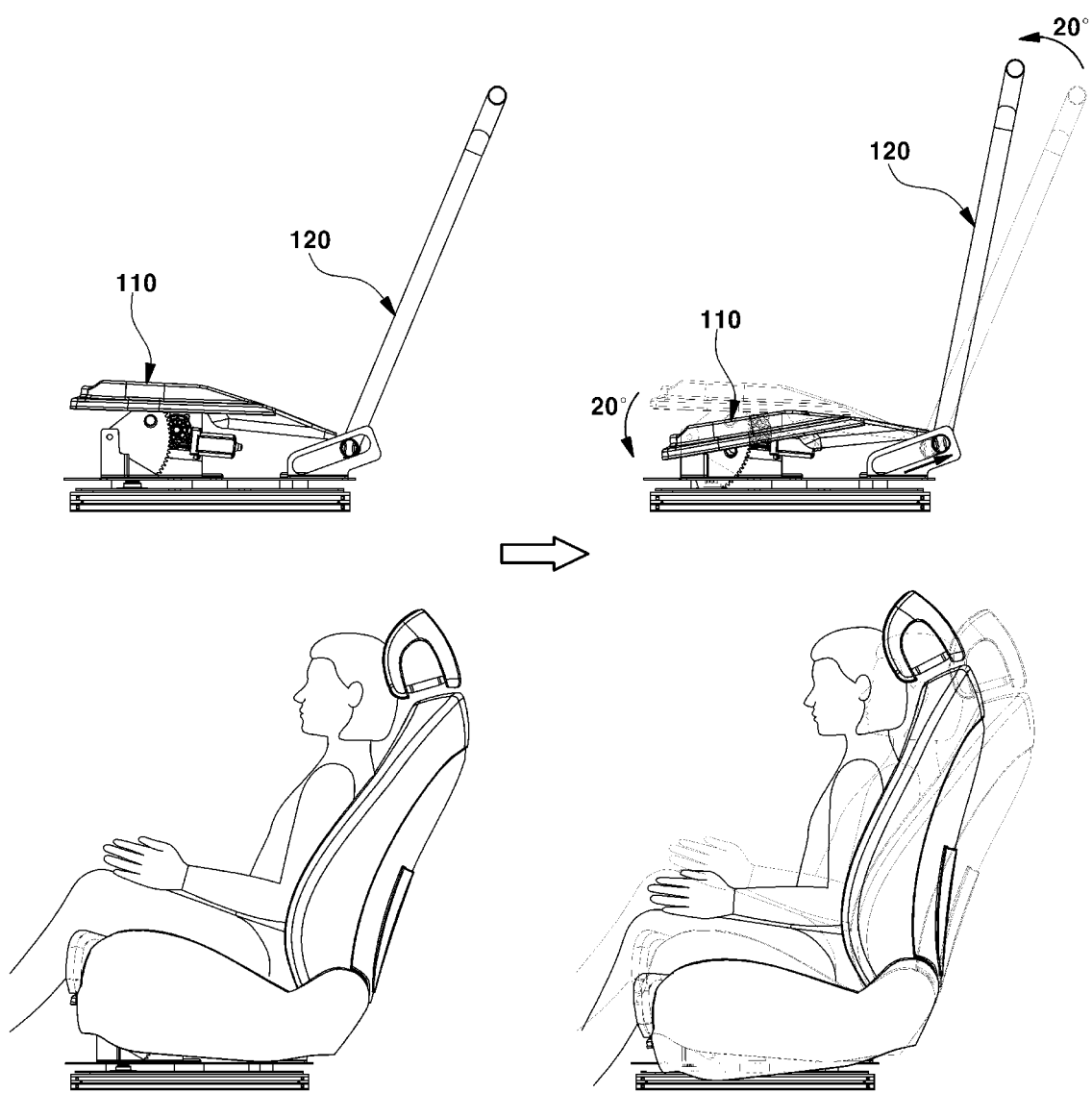
FIG. 5B is a side view showing a tilting-down operation state for assisting the getting on and off vehicle of the seat of the vehicle according to an exemplary embodiment of the present disclosure.

The attached FIG. 2 and FIG. 5A show a tilting-up operation state of the seat of the vehicle according to the present disclosure, and FIG. 3 and FIG. 5B show a tilting-down operation state of the seat of the vehicle according to the present disclosure. In the present disclosure, the tilting-up and tilting-down operation of the seat causes the seat back and the seat cushion to be tilted together at the same angle since the rear end portion of the seat cushion frame 110 and the lower end portion of the seat back frame 120 are integrally connected with each other.

For example, as shown in FIG. 5A, the tilting-up angle for the relaxation of the seat may be limited to about 20° as a range without interference with the rear seat package trim (e.g., the partition wall with the trunk space). Additionally, as shown in FIG. 5B, the tilting-down angle of the seat may also be limited to about 20 degrees, which is suitable for getting on and off vehicle assistance (e.g., entering and exiting the vehicle with assistance). For the tilting-up operation of the seat, at first, when the second motor 62 rotates in the forward direction and the drive gear 63 rotates in the forward direction simultaneously, the fan-shaped gear 61 may be configured to rotate at a predetermined angle upwardly.

Further, the support pipe 64 fastened with a hinge to the fan-shaped gear 61 rises, and since support pipe 64 is inserted into the clamp 112 of the seat cushion frame 110, the front end portion of the seat cushion frame 110 may also rise (e.g., rise in height). At the same time, the guide pipe 122 formed on both sides of the lower end of the seat back frame 120, as shown in FIG. 2 and FIG. 5A, may be moved downwardly from the rear end portion to the front end portion of the guide aperture 51 of the second side bracket 50. Thus, the seat cushion frame 110 and the seat back frame 120 may be simultaneously tilted up to about 20 degrees toward the rear, so that, as shown in FIG. 5A, the relaxation mode of the seat may be implemented in which the passenger may relax comfortably.

In addition, for the following tilting operation, at first, when the second motor 62 rotates in the reverse direction and the drive gear 63 rotates simultaneously in the reverse direction, the fan-shaped gear 61 may be configured to rotate in a downward direction. The support pipe 64 fastened with a hinge to the fan-shaped gear 61 may be lowered, and since support pipe 64 is inserted into the clamp 112 of the seat cushion frame 110, the front end portion of the seat cushion frame 110 may also be lowered.

At the same time, the guide pipe 122 formed on both sides of the lower end of the seat back frame 120, as shown in FIG. 3 and FIG. 5B, may be moved upwardly from the front end portion to the rear end portion of the guide aperture 51 of the second side bracket 50. Thus, the seat cushion frame 110 and the seat back frame 120 may be simultaneously tilted down to about 20 degrees toward the front, so that, as shown in FIG. 5B, the getting on and off vehicle assistance mode of the seat may be implemented in which the passenger may get on and off comfortably in a state that the seat is rotated toward the door.

Swiveling Operation

Figure 8:
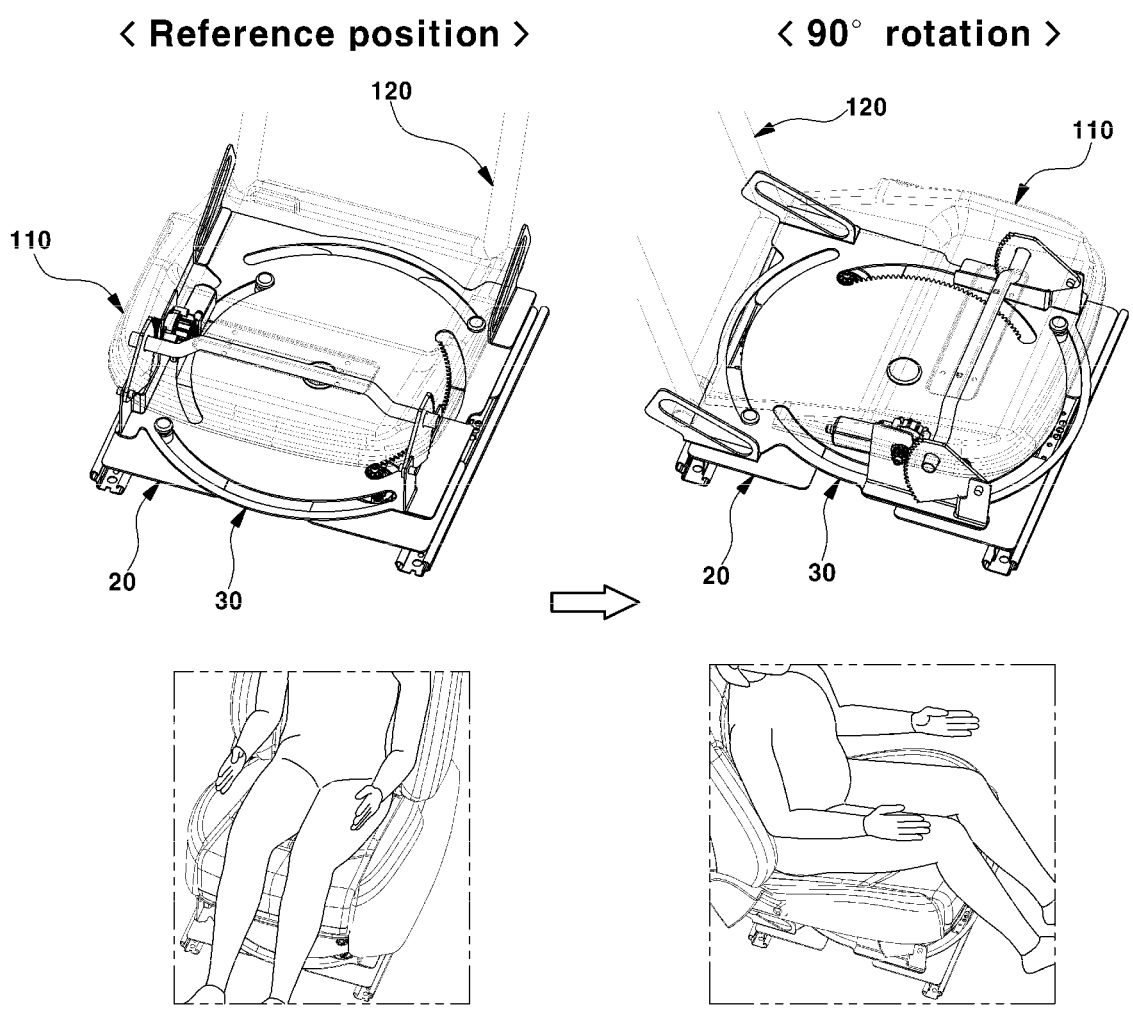
FIG. 8 is a perspective view showing the swiveling operation state of the seat of the vehicle according to an exemplary embodiment of the present disclosure.

The attached FIG. 6 and FIG. 7 show the configuration of the swiveling operation of the seat of the vehicle according to the present disclosure and FIG. 8 shows the swiveling operation example of the seat. Since the rotating plate 30 is installed to be rotatable in an indoor direction or an outdoor direction (e.g., door direction), a swiveling mode in which the seat may be rotated from the reference position facing forward to about 90 degrees in the indoor or an outdoor direction may be implemented.

Accordingly, at first, when the first motor 23 is rotated and simultaneously, the pinion 24 connected to the output shaft of the first motor 23 is rotated, the torque of the pinion 24 may be transmitted to the sector gear 33 of the rotating plate 30. The torque of the pinion 24 causes the rotating plate 30 with the sector gear 33 to rotate. At this time, the guide pin 22 of the fixing plate 20 inserted in the arc-shaped guide aperture 32 of the rotating plate 30 may limit the maximum rotation angle of the rotating plate 30.

For example, when the rotating plate 30 is rotated at a maximum angle of about 90° with the guide pin 22 positioned at a first end of the arc-shaped guide aperture 32 of the rotating plate 30, the guide pin 22 may be positioned at a second end of the arc-shaped guide aperture 32 and thus, the rotation angle of the rotating plate 30 may be limited to a maximum angle of about 90°. Similarly, the entire seat may be configured to rotate in the indoor direction by rotating the rotating plate 30, thereby achieving a conversation mode of the seat capable of facing the passengers to each other, or the entire seat may be rotated in the outdoor direction (e.g., door direction) so that the passenger is in the state of facing the door, thereby implementing a getting on and off vehicle assistance mode of the seat in which the passenger may conveniently enter and exit the vehicle.

Figure 9:
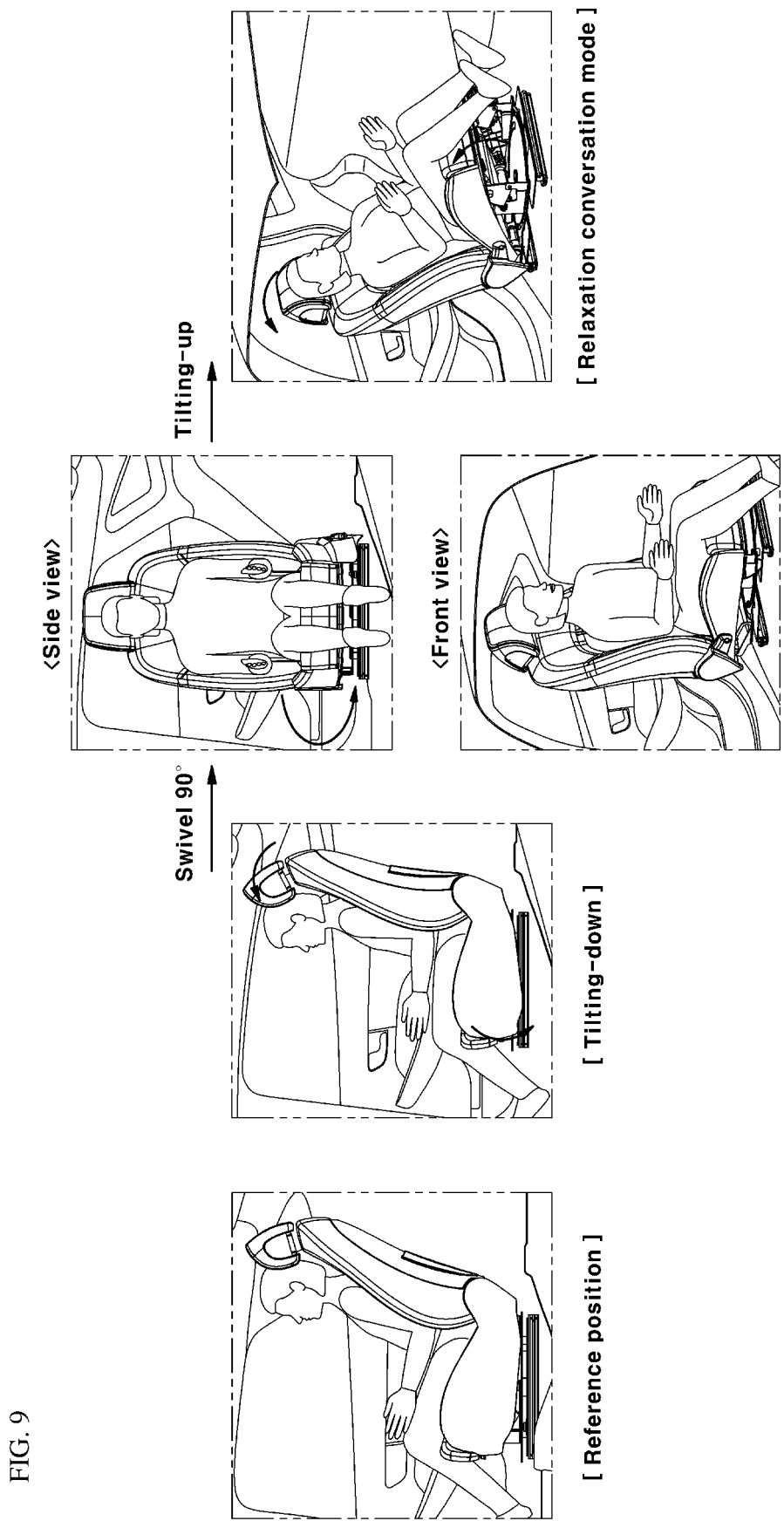
FIG. 9 and FIG. 10 are drawings showing the tilting operation and swiveling operation examples of the seat of the vehicle according to an exemplary embodiment of the present disclosure.

The attached FIG. 9 shows the example of implementing a relaxation and conversation mode by operating the tilting and swiveling of the seat together according to the present disclosure. As shown in FIG. 9, when rotating the seat in the indoor direction from the reference position facing the front, the seat forward may be tilted down as described above and then may be rotated in the indoor direction to avoid interference with the parts around the seat. After the seat is rotated in the indoor direction by the above-described seat swivel configuration, the relaxation and conversation mode in which the passenger may communicate with the other party in a comfortable posture with facing to each other may be implemented through the tilting-up operation of the seat as described above.

Figure 10:
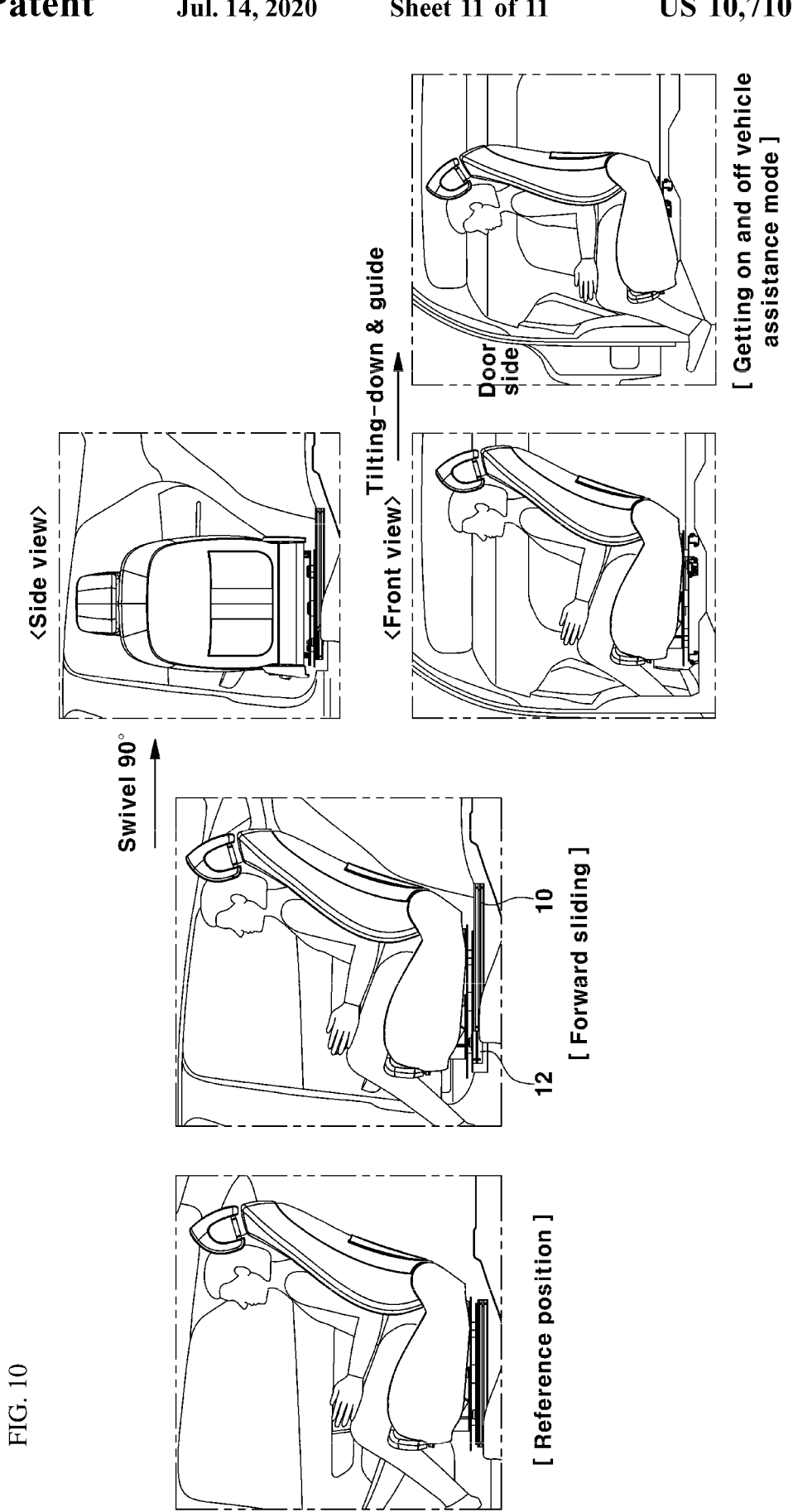

The attached FIG. 10 shows an example of the getting on and off vehicle assistance of the passenger by operating the tilting and swiveling of the seat together according to the present disclosure. As shown in FIG. 10, when rotating the seat from the reference position toward the front to the outdoor direction (door direction), the position between the seat and the door may be matched and simultaneously may be slid the movable rail 12 mounted on the fixed rail 10 forwardly to avoid interference with parts around the seat. After the seat is rotated in the outward direction (door direction) by the seat swivel configuration as described above, the getting on and off vehicle assistance mode of the passenger in which the passenger may conveniently get on and off through the door through the tilting following operation of the seat as described above, may be realized.

What is claimed is:

1. A device for tilting and swiveling a seat of a vehicle, comprising:
    a seat cushion frame and a seat back frame integrally connected with each other;
    a fixing plate mounted on a fixed rail mounted at a floor panel;
    a rotating plate stacked and mounted on the fixing plate to be rotatable;
    a first side bracket mounted at both sides at a front end portion of the rotating plate;
    a second side bracket having a guide aperture formed to be inclined downwardly toward the front to allow a guide pipe formed at both sides of a lower end of the seat back frame to be inserted into the guide aperture to be moved, and being mounted at both sides at a rear end portion of the rotating plate; and
    a tilting drive device installed between the seat cushion frame and the first side bracket, and raising or lowering a front end portion of the seat cushion frame.

2. The device for tilting and swiveling the seat of the vehicle of claim 1, wherein a movable rail is mounted to be movable on the fixed rail at both sides of a lower surface of the fixing plate.

3. The device for tilting and swiveling the seat of the vehicle of claim 1, further comprising:
    a center rotating pin formed at a central position of the fixing plate to couple with a hinge to the rotating plate; and
    guide pins formed at four sides of the rotating plate.

4. The device for tilting and swiveling the seat of the vehicle of claim 3, further comprising:
    a hinge aperture formed at a central position of the rotating plate, wherein the center rotating pin is fastened to the hinge aperture; and
    arc-shaped guide apertures formed at four sides of the rotating plate, wherein the guide pins of the fixing plate are inserted into the arc-shaped guide apertures.

5. The device for tilting and swiveling the seat of the vehicle of claim 4, wherein the arc-shaped guide apertures are formed with an arc length that limits the rotation angle of the rotating plate to about 90°.

6. The device for tilting and swiveling the seat of the vehicle of claim 4, further comprising:
    a first motor mounted at a lower portion of the fixing plate, wherein one of the guide pins is adopted as a pinion connected to the output shaft of the first motor; and a sector gear engaged with the pinion is formed in one of the arc-shaped guide apertures.

7. The device for tilting and swiveling the seat of the vehicle of claim 1, wherein the tilting drive device includes:
- a fan-shaped gear fastened with a hinge to a front end portion of the first side bracket;
- a second motor mounted at an inner position of a rear end portion of the first side bracket;
- a drive gear connected with the output shaft of the second motor, mounted at a rear end portion of the first side bracket and engaged with the fan-shaped gear; and
- a support pipe attached at a front lower portion of the seat cushion frame and fastened with a hinge to the fan-shaped gear at both sides thereof.

8. The device for tilting and swiveling the seat of the vehicle of claim 7, wherein a clamp into which the support pipe is inserted and penetrates to be rotatable and movable back and forth, is mounted at a front lower portion of the seat cushion frame.

9. The device for tilting and swiveling the seat of the vehicle of claim 7, wherein the first side bracket includes:
- a rotation support plate fastened with a hinge to the fan-shaped gear; and
- a rigidity reinforcing plate having a height lower than that of the rotation support plate and being vertically bent inward.

10. The device for tilting and swiveling the seat of the vehicle of claim 7, wherein a mounting end for mounting the second motor is formed to further extend at a rear end portion of the rigidity reinforcing plate of the first side bracket.

* * * * *